United States Patent
Eguchi et al.

(10) Patent No.: US 10,274,936 B2
(45) Date of Patent: Apr. 30, 2019

(54) CONTROL APPARATUS

(71) Applicant: OMRON Corporation, Kyoto-shi, Kyoto (JP)

(72) Inventors: Shigeyuki Eguchi, Joyo (JP); Norihiro Maekawa, Takatsuki (JP); Yoshihide Tamura, Kyoto (JP); Yoshihide Nishiyama, Yokohama (JP)

(73) Assignee: OMRON Corporation, Kyoto-shi (JP)

( * ) Notice: Subject to any disclaimer, the term of this patent is extended or adjusted under 35 U.S.C. 154(b) by 161 days.

(21) Appl. No.: 14/949,953

(22) Filed: Nov. 24, 2015

(65) Prior Publication Data

US 2016/0291581 A1 Oct. 6, 2016

(30) Foreign Application Priority Data

Mar. 31, 2015 (JP) .................. 2015-074554

(51) Int. Cl.
*G06F 9/28* (2006.01)
*G05B 19/4155* (2006.01)
(Continued)

(52) U.S. Cl.
CPC ..... *G05B 19/4155* (2013.01); *G05B 19/0421* (2013.01); *G06F 9/4887* (2013.01);
(Continued)

(58) Field of Classification Search
CPC ............ G05B 19/4155; G05B 19/0421; G05B 2219/2205; G05B 2219/33273; G06F 9/4887

See application file for complete search history.

(56) References Cited

U.S. PATENT DOCUMENTS

| | | |
|---|---|---|
| 5,390,103 A | 2/1995 | Sakakibara |
| 2003/0163512 A1 | 8/2003 | Mikamo |

(Continued)

FOREIGN PATENT DOCUMENTS

| | | |
|---|---|---|
| CN | 103052924 A | 4/2013 |
| CN | 103403684 A | 11/2013 |

(Continued)

OTHER PUBLICATIONS

Frank Bartos, "Computing Power: Multi-Core Processors Help Industrial Automation", Control Engineering, (Feb. 14, 2011), URL: http://www.controleng.com/single-article/computing-power-multi-core-processors-help-industrial-automation/0266edc93194e26de646c0bc458dc9f0.html, (retrieved on Sep. 12, 2016), dated Sep. 22, 2016 in the counterpart EP patent application.

(Continued)

*Primary Examiner* — Miranda M Huang
*Assistant Examiner* — Brian T McMenemy
(74) *Attorney, Agent, or Firm* — Metrolexis Law Group, PLLC (57) ABSTRACT

Provided is a control apparatus that can, by causing multiple control programs that include motion computation programs to be executed in parallel, shorten the execution cycle of control programs that are executed cyclically. A microprocessor is configured to execute multiple control programs in parallel. When executing communication commands included in control programs that are to be executed in parallel, a scheduling program causes the microprocessor to execute the communication commands such that there is no competition between communication processes in a communication controller.

1 Claim, 9 Drawing Sheets

(51) Int. Cl.
*G06F 9/48* (2006.01)
*G05B 19/042* (2006.01)

(52) U.S. Cl.
CPC .......... *G05B 2219/2205* (2013.01); *G05B 2219/33273* (2013.01)

(56) References Cited

U.S. PATENT DOCUMENTS

| | | | | |
|---|---|---|---|---|
| 2006/0112390 | A1* | 5/2006 | Hamaoka | G06F 9/5066 718/102 |
| 2011/0302589 | A1* | 12/2011 | Aussagues | G06F 9/3851 718/104 |
| 2012/0197416 | A1* | 8/2012 | Taira | G05B 9/02 700/14 |
| 2012/0239172 | A1* | 9/2012 | Nishiyama | G05B 19/05 700/86 |
| 2014/0005805 | A1 | 1/2014 | Nishiyama et al. | |
| 2014/0349630 | A1* | 11/2014 | Hyde | H04W 24/02 455/418 |

FOREIGN PATENT DOCUMENTS

| | | |
|---|---|---|
| EP | 2672384 A1 | 12/2013 |
| JP | H4-133102 A | 5/1992 |
| JP | H5-46223 A | 2/1993 |
| JP | 2003-256221 A | 9/2003 |
| JP | 4752984 B1 | 8/2011 |
| JP | 2012-194666 A | 10/2012 |

OTHER PUBLICATIONS

Roman Obermaisser, "Excerpts from Embedded Systems : Time-Triggered Communication", ISBN 978-1-4398-4662-9, (Jan. 10, 2011), p. 80-83, 361-373, URL: http://site.ebrary.com/lib/epo/detail.action?docID=10502489, (retrieved on Sep. 9, 2016), dated Sep. 22, 2016 in the counterpart EP patent application.
The Japanese Office Action dated Nov. 6, 2018 in a counterpart Japanese patent application.
The Chinese Office Action dated Mar. 27, 2018 in a counterpart Chinese patent application.
The Japanese Office Action (JPOA) dated Jun. 5, 2018 in a counterpart Japanese patent application.

* cited by examiner

| Unit position | Unit | Control program | |
|---|---|---|---|
| | ▽ Network setting | | |
| Master | Master | | |
| NODE1 | R88D-KN01H-EC | Control program 1 | ▽ |
| NODE2 | R88D-KN01H-EC | Control program 1 | ▽ |
| NODE3 | R88D-KN01H-EC | Control program 1 | ▽ |
| NODE4 | R88D-KN01H-EC | Control program 2 | ▽ |
| NODE5 | R88D-KN01H-EC | Control program 2 | ▽ |

CONTROL APPARATUS

CROSS-REFERENCES TO RELATED APPLICATIONS

This application claims priority to Japanese Patent Application No. 2015-074554 filed Mar. 31, 2015, the entire contents of which are incorporated herein by reference.

FIELD

The present invention relates to the scheduling of the execution of control programs using a multicore processor in a control apparatus used for controlling the operation of machinery and equipment.

BACKGROUND

Control of the operation of machinery, equipment, and the like sometimes includes motion control for controlling the running of motors. As a typical example of this motion control, there is known to be a programmable controller in which one CPU executes motion computation programs for cyclically outputting command values to a motor driver that drives a motor, and also executes sequence computations.

For example, JP 4752984B discloses a programmable controller that executes a motion computation program for cyclically outputting command values to a motor driver that drives a motor.

In JP 4752984B, the programmable controller executes a control program 1 that includes a first motion computation program and operates at a first control cycle (short-cycle motion program), and a control program 2 that includes a second motion computation program and outputs command values to a motor at a cycle that is an integer multiple of the first control cycle (long-cycle motion program). The execution of the second control program is started after the end of the execution of the first control program.

If the execution of the second control program does not end in the predetermined control cycle, the unprocessed portion of the second control program is executed after the end of the execution of the first control program in the next control cycle of the first control program.

JP 4752984B is an example of background art.

SUMMARY

In machinery in which motors are controlled using these control apparatuses, there is demand for a reduction in the amount of time required to perform computation on input data received from the device to be controlled (control target device), and output command values to the motors as computation results. Presuming that the operations of the control apparatus include repeatedly executing the cyclic importing of input data, calculation of output data by performing computation using the input data, and transmission of the output data, it is desirable to be able to perform the importing of input data, the execution of computation on the input data, the calculation of output data, and the transmission of the output data in different execution cycles in accordance with the control objectives.

In the control apparatus disclosed in Patent Document 1, in order to prioritize the execution of the short-cycle motion program and execute the long-cycle motion program after the short-cycle motion program has ended, a restriction is placed on the time for which the long-cycle motion program can be executed. Since motion computation programs need to cyclically output command values to the control target (a motor or the like), the execution cycle of the long-cycle motion program needs to be set after estimating the execution time of the short-cycle motion program, and the execution cycle of the long-cycle motion program becomes lengthy.

Also, when creating multiple control programs that include motion computation programs and are to be executed by a control apparatus, the user is burdened by the design of the device from which input data targeted for execution is to be received, the design of the execution cycle and execution timing, and the like.

An object of the present invention is to provide a control apparatus that, by causing multiple control programs that include motion computation programs to be executed in parallel, can shorten the execution cycles of multiple control programs that are executed cyclically.

Another object of the present invention is to provide a control apparatus for which the creation of control programs executed in parallel is easy.

In order to solve the above-described issues, a control apparatus according to the present invention is a control apparatus that is connectable to a control target device via a network and that is configured to control the control target device by subjecting input data from the control target device to computation and outputting a result of the computation, the control apparatus including: a microprocessor having a first core and a second core; a communication circuit that is configured to communicate with the connected control target device; a first user program that is to be executed by the first core and a second user program that is to be executed by the second core, the first user program and the second user program defining content of control of the control target device; a first motion computation program that is to be executed by the first core and is for calculating a command value for the control target device in accordance with an instruction from the first user program and a first cycle; a second motion computation program that is to be executed by the second core and is for calculating a command value for the control target device in accordance with an instruction from the second user program and a second cycle; a first input program that is to be executed by the first core and a second input program that is to be executed by the second core, the first input program and the second input program being loaded to a memory via the communication circuit and placed in a state in which input data from the control target device can be subjected to computation; a first output program that is to be executed by the first core and a second output program that is to be executed by the second core, the first output program and the second output program generating output data that includes the command values and can be transmitted via the communication circuit; and a memory used for storage with a scheduling program, wherein the scheduling program causes the first input program, the first output program, the first user program, and the first motion computation program to be executed by the first core in repetition at the first cycle, and causes the second input program, the second output program, the second user program, and the second motion computation program to be executed by the second core in repetition at the second cycle.

The present invention has an effect of making it possible to, by executing a short-cycle motion computation program and a long-cycle motion computation program in parallel, shorten the input/output time related to the short-cycle motion computation program and also shorten the execution cycle of the long-cycle motion computation program.

DETAILED DESCRIPTION

System Configuration

A control apparatus according to an embodiment of the present invention controls a control target such as a machine or a piece of equipment. The control apparatus of the present embodiment includes a CPU unit as a constituent element. The CPU unit includes a microprocessor, a storage unit that includes a main memory for the microprocessor, and communication circuits. The CPU unit of the control apparatus of the present embodiment is configured to control the control target by repeatedly performing the transmission of output data, the reception of input data, and the execution of control programs for generating output data with use of input data.

The storage unit is used for the storage of control programs and a system program for controlling the execution of the control programs and the input/output of input data and output data. The microprocessor executes the system program and the control programs stored in the storage unit.

The communication circuits transmit output data and receive input data. As will be described later, the control apparatus of the present embodiment has, as the communication circuits, a first communication circuit that performs the transmission of output data and the reception of input data using the system bus of the control apparatus, and a second communication circuit that performs the transmission of output data and the reception of input data using a field network.

Figure 1:
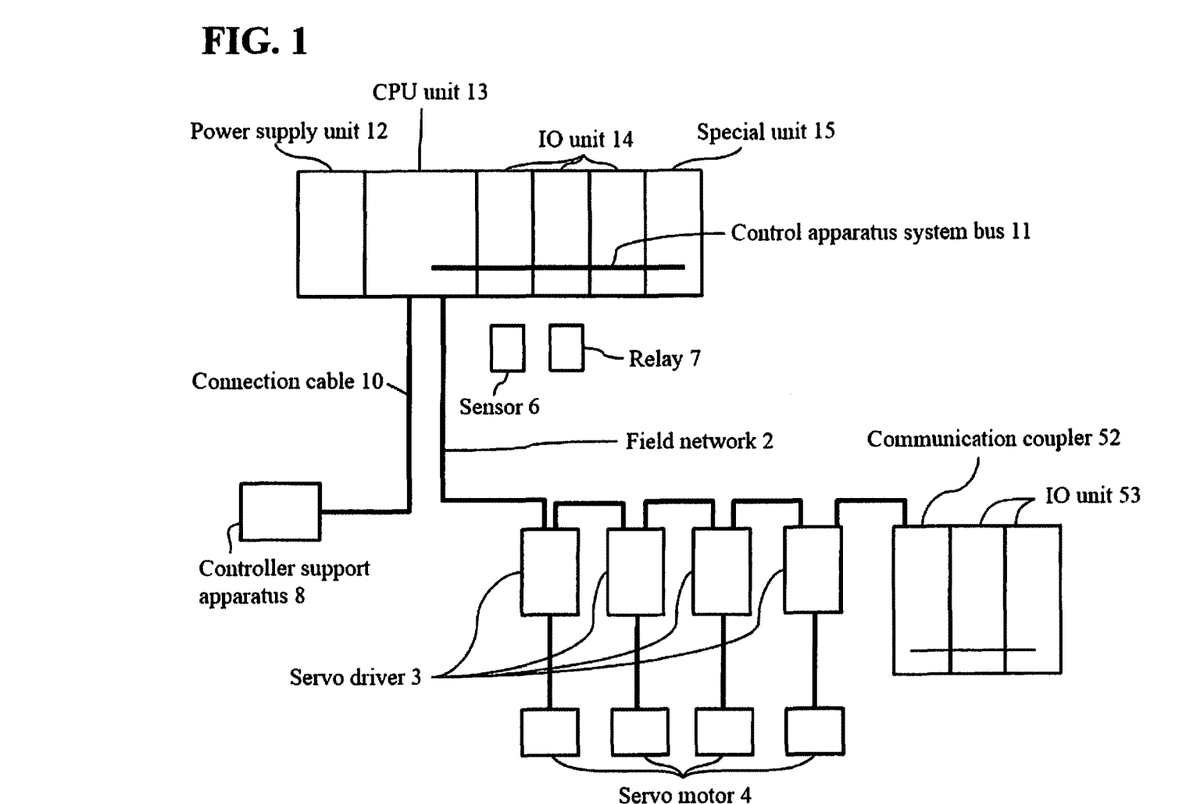
FIG. 1 is a diagram showing a system configuration of a control apparatus according to an embodiment of the present invention.

First, the system configuration of a control apparatus 1 of the present embodiment will be described with reference to FIG. 1. FIG. 1 is a schematic diagram showing the schematic configuration of a control apparatus system according to the present embodiment of the present invention. As shown in FIG. 1, a control apparatus system SYS includes the control apparatus 1, servo motor drivers 3 and a remote IO terminal 5 that are connected to the control apparatus 1 via a field network 2, as well as a sensor 6 and a relay 7 that are field devices. A controller support apparatus 8 is also connected to the control apparatus 1 via a connection cable 10 or the like.

The control apparatus 1 includes a CPU unit 13 that executes main computation processing, one or more IO units 14, and a special unit 15. These units are configured to be able to exchange data with each other via a control apparatus system bus 11. Also, power of an appropriate voltage is supplied to these units by a power supply unit 12. Note that the units configured as the control apparatus 1 are provided by the control apparatus manufacturer, and therefore the control apparatus system buses 11 that are used are generally independently developed by the respective control apparatus manufacturers. In contrast, as will be described later, it is often the case that the standards and the like of the field network 2 are publicly disclosed in order to enable products from different manufacturers to connect to each other.

Figure 2:
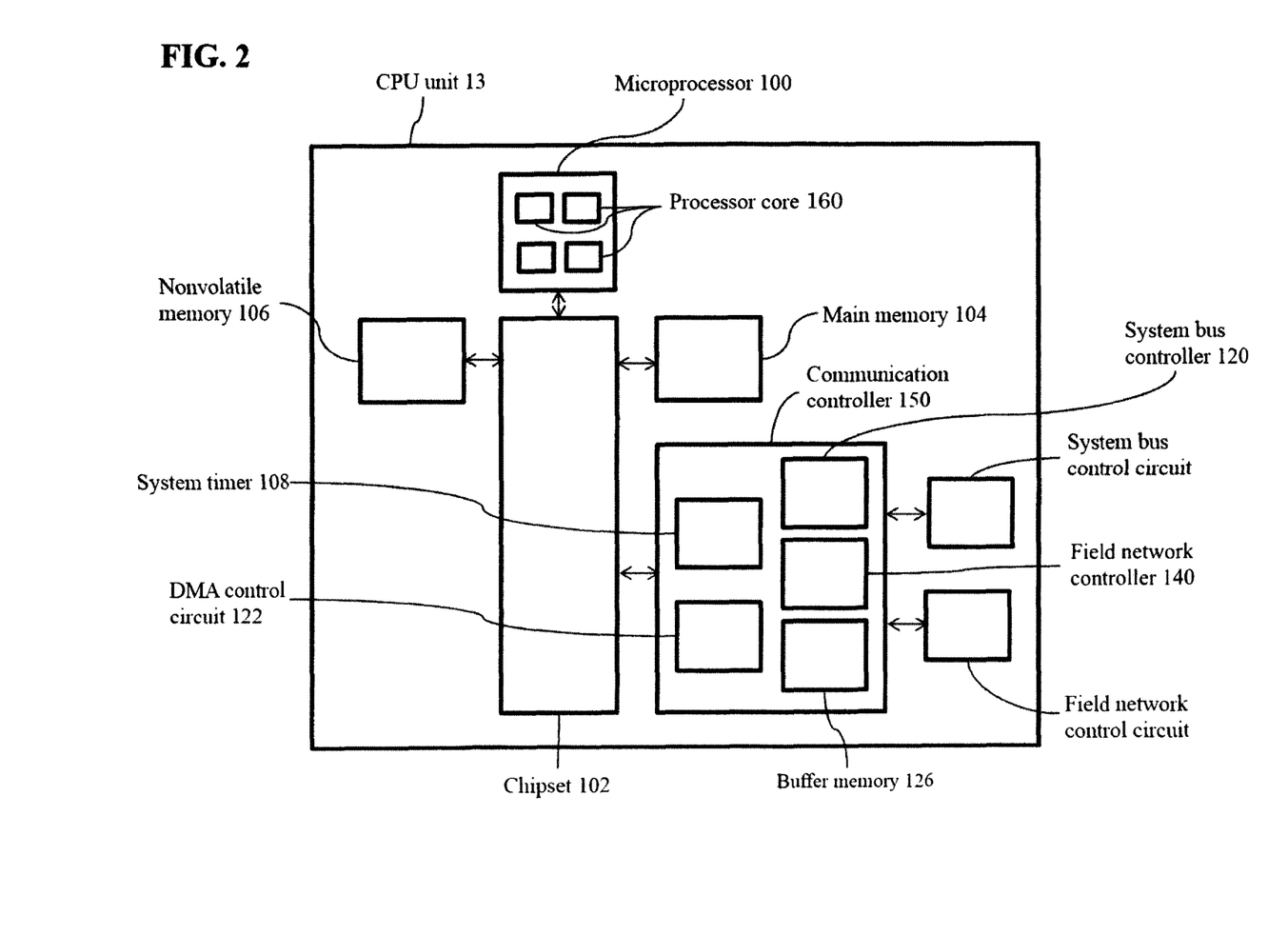
FIG. 2 is a diagram showing a hardware configuration of a CPU unit.

Details of the CPU unit 13 will be described later with reference to FIG. 2. Each IO unit 14 is a unit related to general input/output processing, and is in charge of the input and output of binarized data such as ON/OFF. Specifically, the IO unit 14 collects information indicating whether a sensor such as the sensor 6 is in a state of having detecting some sort of object (ON state) or a state of not having detect any sort of object (OFF state). The IO unit 14 also outputs either a command for activating (ON command) or a command for deactivating (OFF command) to an output destination such as the relay 7 or an actuator.

The special unit 15 has functions not supported in the IO units 14, such as the input and output of analog data, temperature control, and communication by specific communication methods.

The field network 2 transfer various types of data exchanged with the CPU unit 13. An industrial Ethernet (registered trademark) of any of various types can typically be used as the field network 2. Known examples of industrial Ethernets (registered trademark) include EtherCAT (registered trademark), Profinet IRT, MECHATROLINK (registered trademark)-III, Powerlink, SERCOS (registered trademark)-III, and CIP Motion, and any of these may be employed. Furthermore, a field network other than an industrial Ethernet (registered trademark) may be used. For example, in the case where motion control is not performed, DeviceNet, CompoNet/IP (registered trademark), or the like may be used. The present embodiment describes an example of a typical configuration in which EtherCAT (registered trademark), which is an industrial Ethernet (registered trademark), is used as the field network 2 in the control apparatus system SYS of the present embodiment.

Note that the control apparatus 1 may have a configuration in which, by providing the CPU unit 13 with the functionality of the IO units 14 and the functionality of the servo motor drivers 3, the CPU unit 13 directly controls the control target without the intervention of the IO units 14, the servo motor drivers 3, or the like, to the extent that such functionality can be handled by the built-in functionality of the CPU unit 13.

The servo motor drivers 3 are connected to the CPU unit 13 via the field network 2, and drive servo motors 4 in accordance with command values from the CPU unit 13. More specifically, each servo motor driver 3 receives command values such as a position command value, a speed command value, and a torque command value from the control apparatus 1 at a fixed cycle. The servo motor driver 3 also acquires measured values pertaining to the operation of the servo motor 4, such as a position, a speed (typically calculated based on the difference between the current position and the previous position), and a torque from detectors such as a position sensor (rotary encoder) and a torque sensor that are connected to the shaft of the servo motor 4. The servo motor driver 3 also sets command values from the CPU unit 13 as target values, and performs feedback control using measured values as feedback values. Specifically, the servo motor driver 3 adjusts a current for driving the servo motor 4 such that the measured values approach the target values. Note that the servo motor driver 3 is sometimes also called a servo motor amplifier.

Also, although FIG. 1 shows an example of a system in which the servo motors 4 and the servo motor drivers 3 are combined, it is also possible to employ a system having another configuration, such as a system in which a pulse motor and a pulse motor driver are combined.

The remote IO terminal 5 is also connected to the field network 2 of the control apparatus system SYS shown in FIG. 1. The remote IO terminal 5 basically performs processing related to general input/output processing, similarly to the IO units 14. More specifically, the remote IO terminal 5 includes a communication coupler 52 for performing processing pertaining to data transfer over the field network 2, and one or more IO units 53. These units are configured to be able to exchange data with each other via a remote IO terminal bus 51.

The controller support apparatus 8 will be described later.

Hardware Configuration of CPU Unit

Next, the hardware configuration of the CPU unit 13 will be described with reference to FIG. 2. FIG. 2 is a schematic diagram showing the hardware configuration of the CPU unit 13 according to this embodiment of the present invention. As shown in FIG. 2, the CPU unit 13 includes a microprocessor 100, processor cores 160 of the microprocessor 100, a chipset 102, a main memory 104, a nonvolatile memory 106, a system timer 108, a communication controller 150, a system bus controller 120, a field network controller 140, and a USB connector (not shown). The chipset 102 and the other components are connected to each other via various types of buses.

The microprocessor 100 and the chipset 102 are typically configured in compliance with a general-purpose computer architecture. Specifically, the microprocessor 100 interprets and executes command codes that are successively supplied from the chipset 102 in accordance with an internal clock. The chipset 102 exchanges internal data with various types of connected components, and generates command codes necessary for the microprocessor 100. The chipset 102 furthermore has a function for caching data obtained as a result of the execution of computation processing in the microprocessor 100, for example.

The CPU unit 13 has the main memory 104 and the nonvolatile memory 106 as storage units.

The main memory 104 is a volatile storage area (RAM), and holds various types of programs that are to be executed by the microprocessor 100 after power is supplied to the CPU unit 13. The main memory 104 is also used as a work memory when various types of programs are executed by the microprocessor 100. A device such as a DRAM (Dynamic Random Access Memory) or an SRAM (Static Random Access Memory) is used as the main memory 104.

On the other hand, the nonvolatile memory 106 is a nonvolatile memory for storing a real-time OS (Operating System), the system program of the control apparatus 1, user programs, motion computation programs, and data such as system setting parameters. These programs and data are copied to the main memory 104 as necessary in order to be accessible to the microprocessor 100. A semiconductor memory such as a flash memory can be used as the nonvolatile memory 106. Alternatively, a magnetic recording medium such as a hard disk drive, an optical recording medium such as a DVD-RAM (Digital Versatile Disk Random Access Memory), or the like can be used.

The communication controller 150 is typically constituted by hardware such as an FPGA or an ASIC, and is configured to be able to transmit data to and receive data from the main memory via the chipset. The communication controller 150 has a memory area used for the communication of data with the main memory, and data transferred from the main memory is transferred by the communication controller 150 to the system bus controller 120 and the field network controller 140, which are described later. The communication controller 150 also issues, to the system bus controller 120 and the field network controller 140, commands for transmitting data transferred from the main memory.

The communication controller 150 further includes the system timer 108. The system timer 108 generates an interrupt signal at a fixed cycle, and provides it to the microprocessor 100. Typically, depending on the hardware specifications, it is configured to generate respective interrupt signals at each of different cycles, but it can be set by the OS (Operating System), the BIOS (Basic Input Output System), or the like so as to generate an interrupt signal at an arbitrary cycle. Control operations in each execution cycle, which will be described later, are realized with use of the interrupt signals generated by the system timer 108.

Included among the communication circuits are the system bus controller 120 and the field network controller 140. These communication circuits transmit output data and receive input data.

Note that in the case where the CPU unit 13 itself is given the functionality of the IO units 14 and the servo motor drivers 3, the transmission of output data and the reception of input data by the system bus controller 120 of the control apparatus are performed inside the CPU unit 13, and the portions thereof that handle the respective functions are the communication partners.

The communication controller 150 controls the exchange of data via the control apparatus system bus 11. More specifically, it includes the system bus controller 120, a DMA (Dynamic Memory Access) control circuit 122, and a buffer memory 126.

The buffer memory 126 functions as a transmission buffer for data that is to be output to another unit (hereinafter, "output data") via the control apparatus system bus 11, and a reception buffer for data that is input from another unit (hereinafter, "input data") via the control apparatus system bus 11. Note that output data created by computation processing performed by the microprocessor 100 is originally stored in the main memory 104. Output data that is to be sent to a specific unit is then read out from the main memory 104 and temporarily held in the buffer memory 126. Also, input data transferred from another unit is temporarily held in the buffer memory 126, and then moved to the main memory 104.

The DMA control circuit 122 performs the transfer of output data from the main memory 104 to the buffer memory 126, and the transfer of input data from the buffer memory 126 to the main memory 104.

The communication controller 150 performs processing for transmitting output data in the buffer memory 126 to another unit connected to the control apparatus system bus 11, and processing for receiving first input data and storing it in the buffer memory 126. Typically, the system bus controller 120 provides the functionality of the physical layer and the datalink layer in the control apparatus system bus 11.

The field network controller 140 controls the exchange of data via the field network 2. Specifically, the field network controller 140 controls the transmission of output data and the reception of input data in accordance with the standard of the field network 2 being used. As described above, the field network 2 that is in compliance with the EtherCAT (registered trademark) is employed in the present embodiment, and therefore the field network controller 140 that includes hardware for performing normal Ethernet (registered trademark) communication is used. A general Ethernet (registered trademark) controller that realizes communication protocols that are in compliance with the normal Ethernet (registered trademark) standard can be used in the EtherCAT (registered trademark) standard. Note that depending on the type of industrial Ethernet (registered trademark) employed as the field network 2, there are cases of using an Ethernet (registered trademark) controller having special specifications that support a communication protocol with dedicated-use specifications different from normal communication protocols. Also, in the case of employing a field network other than an industrial Ethernet (registered trademark), a dedicated-use field network controller compliant with the corresponding standard is used.

The buffer memory 126 also functions as a transmission buffer for data that is to be output to another apparatus or the like (hereinafter, "output data") via the field network 2, and a reception buffer for data that is to be input from another apparatus or the like (hereinafter, "input data") via the field network 2. Output data created by computation processing performed by the microprocessor 100 is originally stored in the main memory 104. Output data that is to be transferred to a specific apparatus is then read out from the main memory 104 and temporarily held in the buffer memory 126. Also, input data transferred from another apparatus is temporarily held in the buffer memory 126, and then moved to the main memory 104.

The DMA control circuit 122 performs the transfer of output data from the main memory 104 to the buffer memory 126, and the transfer of input data from the buffer memory 126 to the main memory 104.

The field network controller 140 performs processing for transmitting output data in the buffer memory 126 to another apparatus connected to the field network 2, and processing for receiving input data therefrom and storing it in the buffer memory 126. Typically, the field network controller 140 provides the functionality of the physical layer and the datalink layer in the field network 2.

The USB connector is an interface for connecting the controller support apparatus 8 and the CPU unit 13. Typically, a program or the like that is transferred from the controller support apparatus 8 and can be executed by the microprocessor 100 of the CPU unit 13 is loaded to the control apparatus 1 via the USB connector.

Software Configuration of CPU Unit

Next, pieces of software for providing various types of functions according to the present embodiment will be described with reference to FIG. 3. The command codes included in these pieces of software are read out at appropriate timings and 30 executed by the processor cores 160 and the microprocessor 100 of the CPU unit 13.

Figure 3:
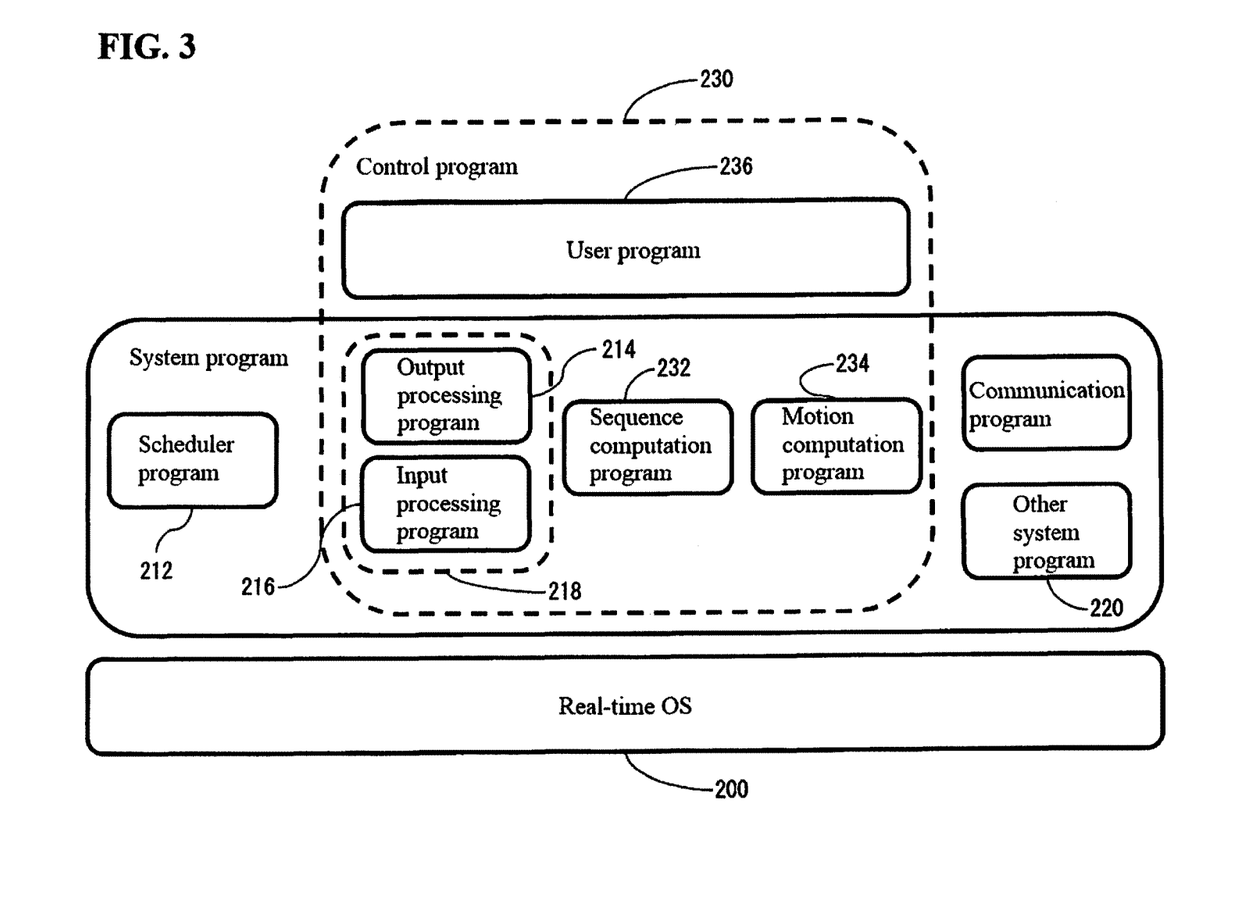
FIG. 3 is a schematic diagram showing a configuration of software executed by the CPU unit according to the embodiment of the present invention.

FIG. 3 is a schematic diagram showing the configuration of software executed by the CPU unit 13 according to this embodiment of the present invention. As shown in FIG. 3, there are three layers of software executed by the CPU unit 13, namely a real-time OS 200, a system program 210, and a user program 236.

The real-time OS 200 is designed according to the computer architecture of the CPU unit 13, and provides the basic execution environment for the microprocessor 100 to execute the system program 210 and the user program 236.

The system program 210 includes pieces of software for providing functionality as the control apparatus 1. Specifically, the system program 210 includes a scheduling program 212, an output processing program 214, an input processing program 216, a sequence command computation program 232, a motion computation program 234, and other system programs 220. Note that the output processing program 214 and the input processing program 216 are generally executed consecutively (in a unified manner), and therefore these programs will sometimes be called an IO processing program 218.

The user program 236 is created according to the user's control objective. Specifically, it is a program designed as necessary according to the line (process) that is to be controlled using the control apparatus system SYS, for example.

As will be described later, the user program 236 realizes the user's control objective in cooperation with the sequence command computation program 232 and the motion computation program 234. Specifically, the user program 236 realizes programmed operations by using commands, mathematical functions, function modules, and the like provided by the sequence command computation program 232 and the motion computation program 234. For this reason, there are cases where the user program 236, the sequence command computation program 232, and the motion computation program 234 will be collectively called a control program 230.

In this way, the microprocessor 100 of the CPU unit 13 executes the system program 210 and the control program 230 that are stored in the storage unit.

The programs will be described in more detail below.

The user program 236 is created according to the user's control objective (e.g., the line or process to be controlled) as described above. The user program 236 is typically in an object program format that can be executed by the microprocessor 100 of the CPU unit 13. This user program 236 is generated by compiling a source program described in a ladder language or the like in the controller support apparatus 8 or the like. The generated user program 236 in the object program format is then transferred from the controller support apparatus 8 to the CPU unit 13 via the connection cable 10 and stored in the nonvolatile memory 106 or the like.

The scheduling program 212 controls the start of processing in each execution cycle and the resuming of processing after a processing interruption for the output processing program 214, the input processing program 216, and the control program 230. More specifically, the scheduling program 212 controls the execution of the user program 236 and the motion computation program 234.

In the CPU unit 13 of the present embodiment, an execution cycle (control cycle) with a fixed cycle that is suited to the motion computation program 234 is employed as a common cycle for processing overall. For this reason, it is difficult for all processes to be completed in one control cycle, and therefore the processes are separated into processes whose execution needs to be completed in each control cycle, and processes whose execution may span multiple control cycles, according to the priority of the process that is to be executed or the like. The scheduling program 212 manages the execution sequence and the like of the processes separated in this way. More specifically, according to the scheduling program 212, a program given a higher priority order is executed earlier in each control cycle period.

The output processing program 214 rearranges output data generated by the execution of the user program 236 (control program 230) into a format suited to transfer to the communication controller 150. In the case where the system bus controller 120 or the field network controller 140 needs an instruction from the microprocessor 100 for executing transmission, the output processing program 214 issues that instruction.

The input processing program 216 rearranges input data received by the control apparatus system bus controller 120 and/or the field network controller 140 into a format suited to use by the control program 230.

The sequence command computation program 232 is a program that is called when a certain type of sequence command used in the user program 236 is to be executed, and is executed in order to realize the content of that command.

The motion computation program 234 is a program that is executed in accordance with an instruction issued by the user program 236, and is executed each time a command value to be output to a motor driver such as a servo motor driver 3 or a pulse motor driver is to be calculated.

The other system program 220 collectively indicates a group of programs for realizing various functions of the control apparatus 1, other than the programs shown individually in FIG. 3. One example is a program for causing the microprocessor to execute communication with the control apparatus of a piece of machinery, processing according to a request from an external device, and self-diagnosis processing. The other system program also includes a program for executing processing for transferring data in the main memory to an external storage medium and processing for reading out data from an external storage medium.

The real-time OS 200 provides an environment for switching between and executing multiple programs in accordance with the elapse of time. In the control apparatus 1 of the present embodiment, a control cycle start interrupt is initially set as an event (interrupt) for outputting (transmitting) output data generated by the execution of a program by the CPU unit 13 to another unit or another apparatus. When a control cycle start interrupt is generated, the real-time OS 200 switches the execution target in the microprocessor 100 from the program being executed at the time of the interrupt generation to the scheduling program 212. Note that in the case where neither the scheduling program 212 nor any program whose execution is controlled by the scheduling program 212 is being executed, the real-time OS 200 executes a program included in the other system program 210. Examples of such a program include a program related to processing for communication between the CPU unit 13 and the controller support apparatus 8 via the connection cable 10 (USB) or the like.

Note that the control program 230 and the scheduling program 212 are stored in the main memory 104 and the nonvolatile memory 106, which are storage units.

Hardware Configuration of Controller Support Apparatus

Next, the controller support apparatus 8 for performing the creation of a program to be executed in the control apparatus 1, maintenance of the control apparatus 1, and the like will be described.

Figure 4:
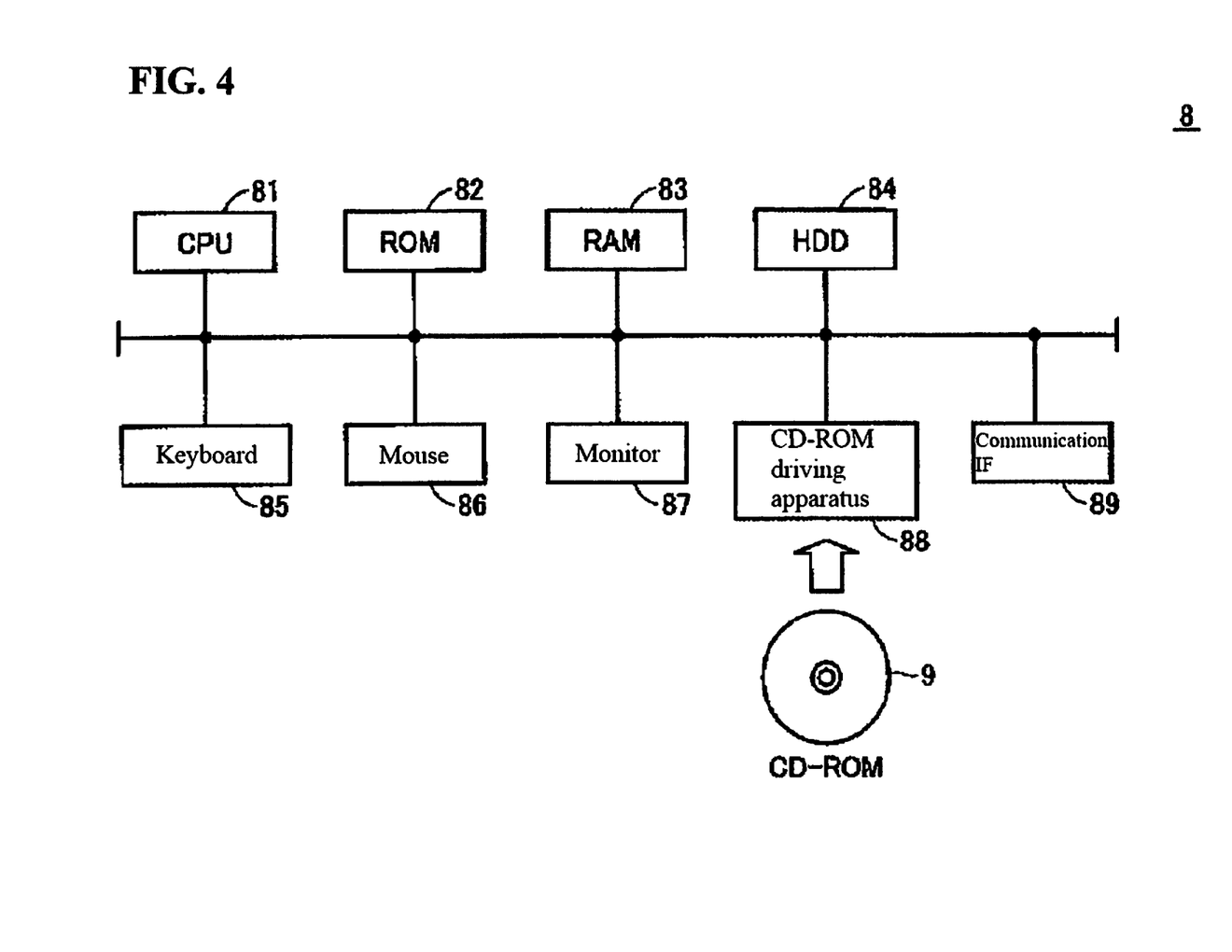
FIG. 4 is a schematic diagram showing a hardware configuration of a controller support apparatus according to the embodiment of the present invention.

FIG. 4 is a schematic diagram showing the hardware configuration of the controller support apparatus 8 according to the embodiment of the present invention. As shown in FIG. 4, the controller support apparatus 8 is typically constituted by a general-purpose computer. Note that from the viewpoint of maintainability, a notebook personal computer, which is excellent in terms of portability, is preferable.

As shown in FIG. 4, the controller support apparatus 8 includes a CPU 81 that executes various types of programs, including an OS, a ROM (Read Only Memory) 82 that stores a BIOS and various types of data, a RAM 83, which is a memory that provides a work area for the storage of data necessary for the execution of programs by the CPU 81, and a hard disk (HDD) 84, which is a nonvolatile memory for storing programs executed by the CPU 81 and the like. The CPU 81 corresponds to the computation unit of the controller support apparatus 8, and the ROM 82, the RAM 83, and the hard disk 84 correspond to storage units of the controller support apparatus 8.

The controller support apparatus 8 further includes a keyboard 85 and a mouse 86 for receiving operations from the user, and a monitor 87 for presenting information to the user. The controller support apparatus 8 further includes a communication interface (IF) 89 for communicating with the control apparatus 1 (CPU unit 13) and the like.

As will be described later, various types of programs that are to be executed by the controller support apparatus 8 are stored on a CDROM 9 and distributed. A program stored on the CD-ROM 9 is read by a CDROM (Compact Disk-Read Only Memory) drive 88 and stored in the hard disk (HDD) 84 or the like. Alternatively, a configuration is possible in which a program is downloaded from a higher host computer or the like via a network.

Control Program

In the present embodiment, the control program is treated as a unit in which a series of operations are executed, including the IO processing program, the user program, and the sequence computation program and motion computation program that are executed along with the execution of the user program.

In the control apparatus 1 according to the present invention, the cycle for the execution of each control program, the execution priority, an execution start timing that allows each control program to be executed in a shorter cycle, and constraint conditions are set. The user performs programming for achieving the control objective while taking these control program properties into consideration. The scheduling program causes the microprocessor to execute control programs in accordance with the execution priority and execution cycle of the control programs. The control programs will be described next.

A control program 1 is cyclically executed with the highest priority. It includes an output processing program 1 and an input processing program 1, and the transmission of output data, the importing of input data, the execution of an allocated user program 1, the generation of output data, the execution of a motion computation program 1, and the calculation of command values for motors are executed in the stated order.

A control program 2 is cyclically executed with the next highest priority after the control program 1. It includes an output processing program 2 and an input processing program 2, and the transmission of output data, the importing of input data, the execution of an allocated user program 2, and the execution of a motion computation program 2 are executed in the stated order.

A control program 3 is cyclically executed at a fixed cycle. It is a control program based on the presumption of performing the reading of output data and input data that is to be executed in the aforementioned control program 1. Specifically, in accordance with commands in the output processing program and the input processing program that are executed in the control program 1, the transfer of input data that is to be imported is received, and output data is computed.

The control program 3 is a program that is suited to the allocation of a user program included in the control program 1 in the case of allowing execution in a cycle that is somewhat longer than the execution cycle of the control program 1, in order to shorten the execution cycle of the control program 1.

A control program 4 is a program made up of only a user program. It is a program suited to the description of communication processing, backup processing, and the like that do not involve high-speed control computation.

Figure 5:
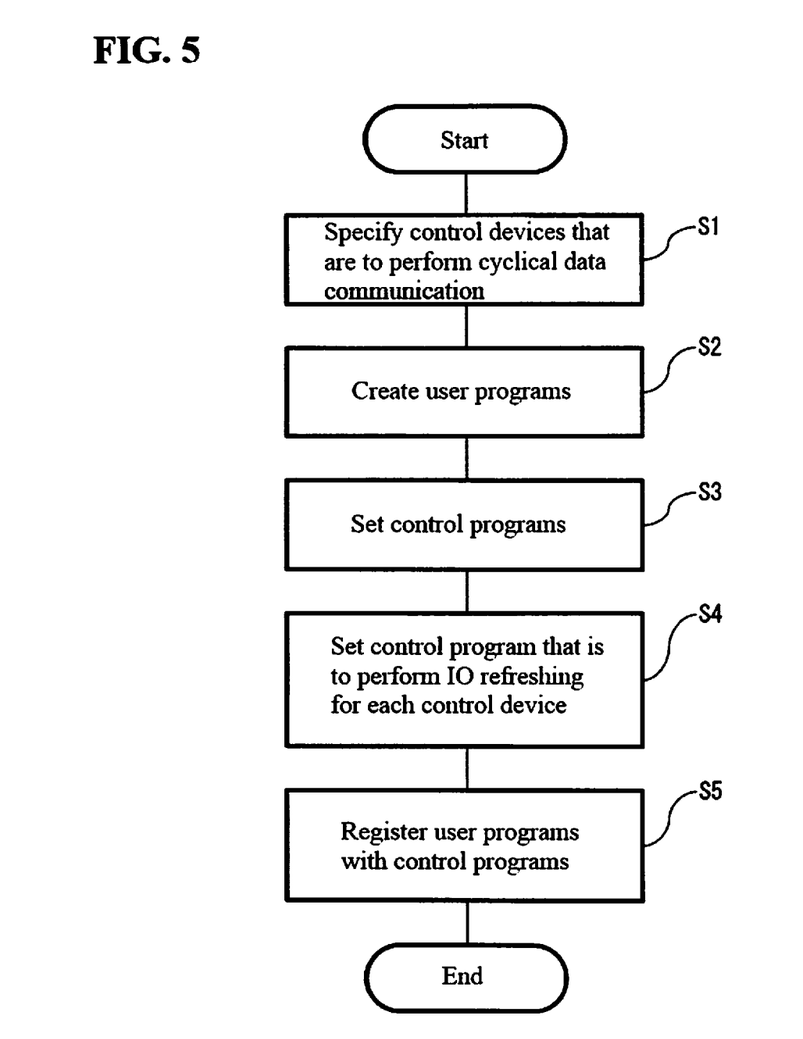
FIG. 5 is a flowchart showing an example of a control apparatus setting procedure in the controller support apparatus.

Next, a programming procedure in a control apparatus that uses the controller support apparatus will be described. FIG. 5 shows an example of a control apparatus setting procedure in the control apparatus.

In step S1, devices that are connected via the field network or the system bus are specified. Specifically, information for performing communication is set for the devices that are connected to the field network or the system bus. This information is registered as variables used in a later-described user program. Although not shown, a configuration is possible in which the devices that are connected via the field network or the system bus and information such as the connection order are acquired automatically by performing communication with the devices connected via the field network or the system bus.

In step S2, the user uses the controller support apparatus to create user programs in accordance with the control object as described above. The user creates programs that execute sequence computation and motion computation using the data that was input from the devices connected to the field network or the system bus and registered in step S1, and generates output data. The creation of these user programs may be divided among multiple program modules.

In step S3, the user performs control program setting. The user sets the cycle for execution of the control program in accordance with the control objective.

Figure 6:
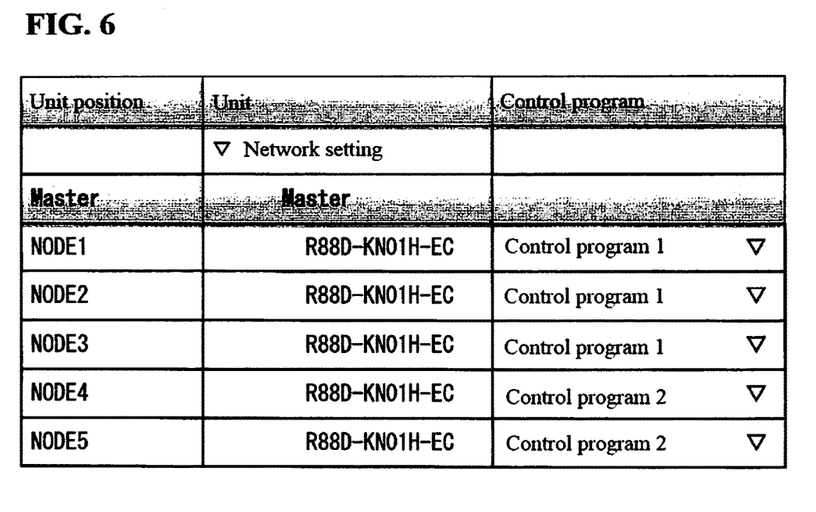
FIG. 6 is a diagram showing an example of a screen for performing control program setting.

In step S4, a control program for performing the reception of input data and the transmission of output data, which is to be executed in accordance with commands in the previously-described IO processing program, is registered for each of the devices that are connected via the network and were set in step S1. FIG. 6 is a diagram showing an example of a screen for performing control program setting. A control program for performing IO refreshing is registered for each device connected to the field network or the system bus. The control target devices are displayed in a list, and unit names are displayed along with them. For each device, the user is allowed to select a control program for performing IO refreshing in a pulldown format.

Figure 7:
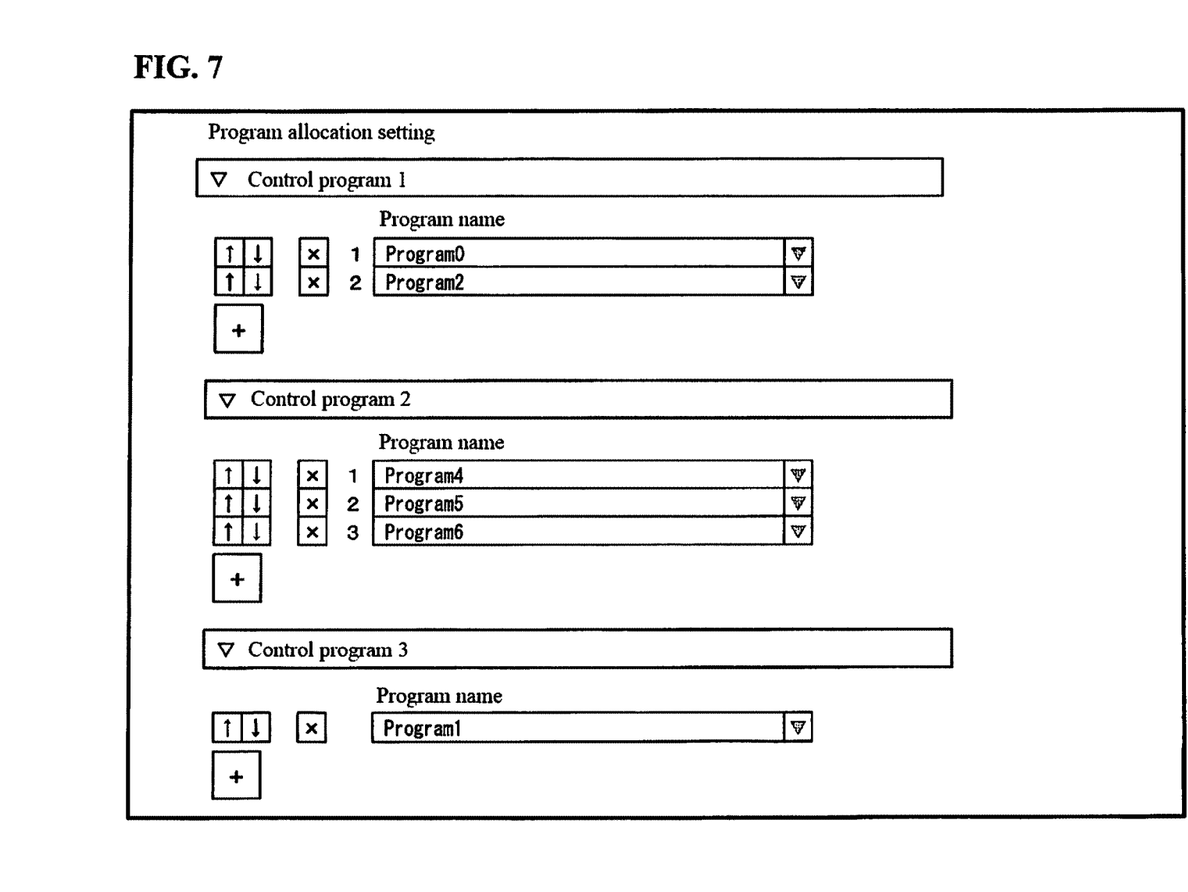
FIG. 7 is a diagram showing an example of a screen for performing control program allocation setting.
Figure 8:
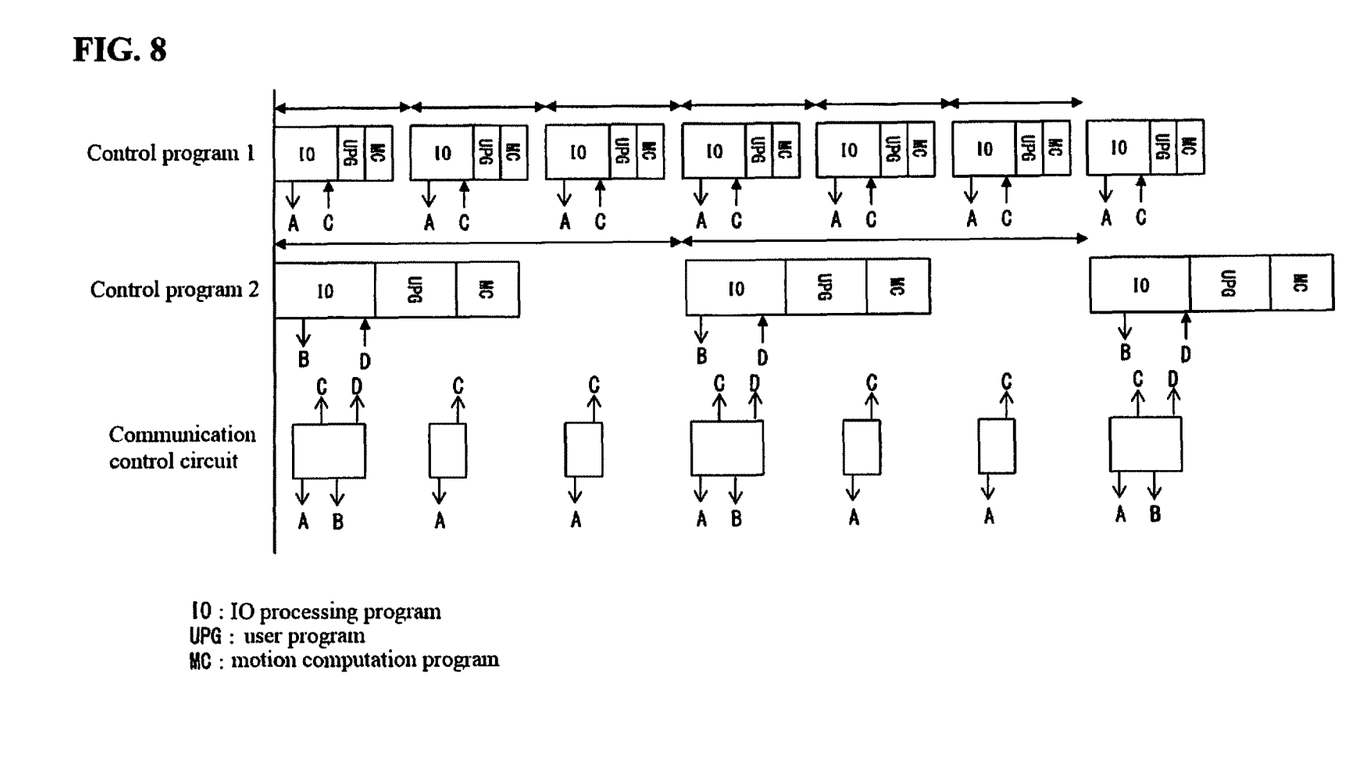
FIG. 8 is a diagram showing an illustration of allocation to control programs.

In step S5, the created user programs are allocated to the control programs. FIG. 8 is a diagram showing an illustration of allocation to control programs. FIG. 7 shows the allocation of the created user programs (Program0 to Program6) to the control programs. In the case where multiple user programs are allocated to one control program, an execution sequence is registered for those user programs. In the example shown in FIG. 7, the user programs Program0 and Program2 have been allocated to the control program 1.

The user programs Program4, Program5, and Program6 have been allocated to the control program 2. The user program Program1 has been allocated to the control program 3.

According the operations described above, each created control program includes a cycle in which it is to be executed, setting parameters indicating the devices that are to perform data transfer in the IO control program included in the control program, and the user programs that are to be executed. The scheduling program of the control apparatus references the transferred setting parameters, references the execution cycle of the control program and the like, and controls the program execution start and end timings. Also, in the present embodiment, the execution cycle of the control program is a cycle in which communication (IO refreshing) is performed with an external device via the field network or the system bus, and the communication programs specifies, based on the setting parameters, the target and device that are to perform IO refreshing in the communication cycle and the aforementioned cycle.

Working Example 1

FIG. 8 shows an example in which the control program 1 and the control program 2 are executed in multiple cores at a fixed cycle. The control program 1 includes an IO processing program 1, a user program 1, and a motion computation program 1, and the control program 2 includes an IO processing program 2, a user program 2, and a motion computation program 2.

The scheduling program monitors the count value of a timer. When a predetermined cycle arrives, the scheduling program starts the execution of the control program 1 in a core 1 of the microprocessor. At the same time, the scheduling programs starts the execution of the control program 2 in a core 2 of the microprocessor.

In the execution of the control program 1, in accordance with commands in the output processing program of the IO control program 1, the core 1 of the microprocessor performs processing for transferring output data 1, which is bound for the external device associated with the control program 1, from the communication buffer in the main memory to the buffer memory of the communication controller 150 ("A" in FIG. 8). The core 1 also transfers the input data 1, which was transferred from the communication controller and is stored in the communication buffer, to the work area of the user program 1 in accordance with commands in the input processing program ("C" in FIG. 8).

In accordance with commands in the user program 1, the core 1 of the microprocessor performs sequence computation with use of the input data stored in the work area of the user program 1, and performs processing for storing the output data in the communication buffer of the main memory. It also performs computation with use of the input data, and calculates output motion control data. The calculated motion control data is transferred to the area in which the motion computation program performs operations.

In accordance with commands in the motion computation program 1, the core 1 of the microprocessor performs computation with use of the motion computation program 1, calculates command values for the motor with respect to the execution cycle of the control program 1, and calculates output data. The output data is transferred to the buffer area for transfer to the communication controller.

The scheduling program monitors the arrival of the next execution cycle, and upon detecting the arrival of the execution cycle, causes the core 1 of the microprocessor to execute the control program 1. The core 1 of the microprocessor is caused to repeatedly execute this series of processing at a fixed cycle.

Next, the execution of the control program 2 will be described. In the execution of the control program 2, in accordance with commands in the IO control program 2, the core 2 of the microprocessor performs processing for transferring output data 1, which is bound for the external device associated with the control program 2, from the main memory to the buffer memory of the communication controller ("B" in FIG. 8). The core 2 also transfers the input data 1, which was transferred from the communication controller and is stored in the communication buffer, to the work area of the user program 1 in accordance with commands in the input processing program ("D" in FIG. 8).

In accordance with commands in the user program 2, the core 2 of the microprocessor performs sequence computation with use of the input data stored in the work area of the user program 2, and performs processing for storing the output data in the communication buffer of the main memory. It also performs computation with use of the input data, and calculates output motion control data. The calculated motion control data is transferred to the area in which the motion computation program 2 performs operations.

In accordance with commands in the motion computation program 2, the core 2 of the microprocessor performs computation with use of the motion computation program 2, calculates command values for a motor with respect to the execution cycle of the control program 2, and calculates output data. Thereafter, the output data is transferred to the communication buffer for transfer to the communication controller.

When the execution of the motion control program 2 is complete, the execution of the control program 2 is complete. The scheduling program monitors the arrival of the next execution cycle, and upon detecting the arrival of the execution cycle, causes the core 2 of the microprocessor to execute the control program 2. The core 2 of the microprocessor is caused to repeatedly execute this series of processing at a fixed cycle.

In this example, although the computation in the control program 2 ends before the computation in the second cycle of the control program 1 ends, output data is transmitted to an external device in accordance with the set execution cycle timing (a multiple of three of the execution cycle of the control program 1).

The scheduling program monitors the arrival of the next execution cycle, and upon detecting the arrival of the execution cycle, causes the core 2 of the microprocessor to execute the control program 2. The core 2 of the microprocessor is caused to repeatedly execute this series of processing at a fixed cycle.

In this working example, the control program 1 and the control program 2 for calculating command values for multiple motors are caused, in parallel, to be executed in parallel by the core 1 and the core 2 of the microprocessor. Although it is described in this example that the control program 2 is executed in parallel at an execution cycle that is a multiple of three of the execution cycle of the control program 1, it may be executed at the same cycle. It may be executed at a cycle that is a multiple of two or more of the execution cycle of the control program 1. By dividing control programs that include control of multiple motors, or more specifically by allocating a motion computation program including the calculation of command values for a motor in the control program 1 to the control program 2, it is possible to shorten the cycle of the execution cycle 1.

In this working example, the execution of the control program 1 and the control program 2 is started from the execution of the output processing program included in the program for controlling IO, but a configuration is possible in which the execution of the control programs is started from the input processing program, and the user program, the motion computation program, and the output processing program are cyclically executed in the stated order as shown in the figure.

Furthermore, although an example in which motion computation programs are included in the control programs 1 and 2 is described in this working example, there may be cases where the execution of motion computation programs is not included in any of the control programs.

Working Example 2

The following description relates to the timing of the start of execution of the control programs 1, 2, and 3 with use of the multicore processor.

Figure 9:
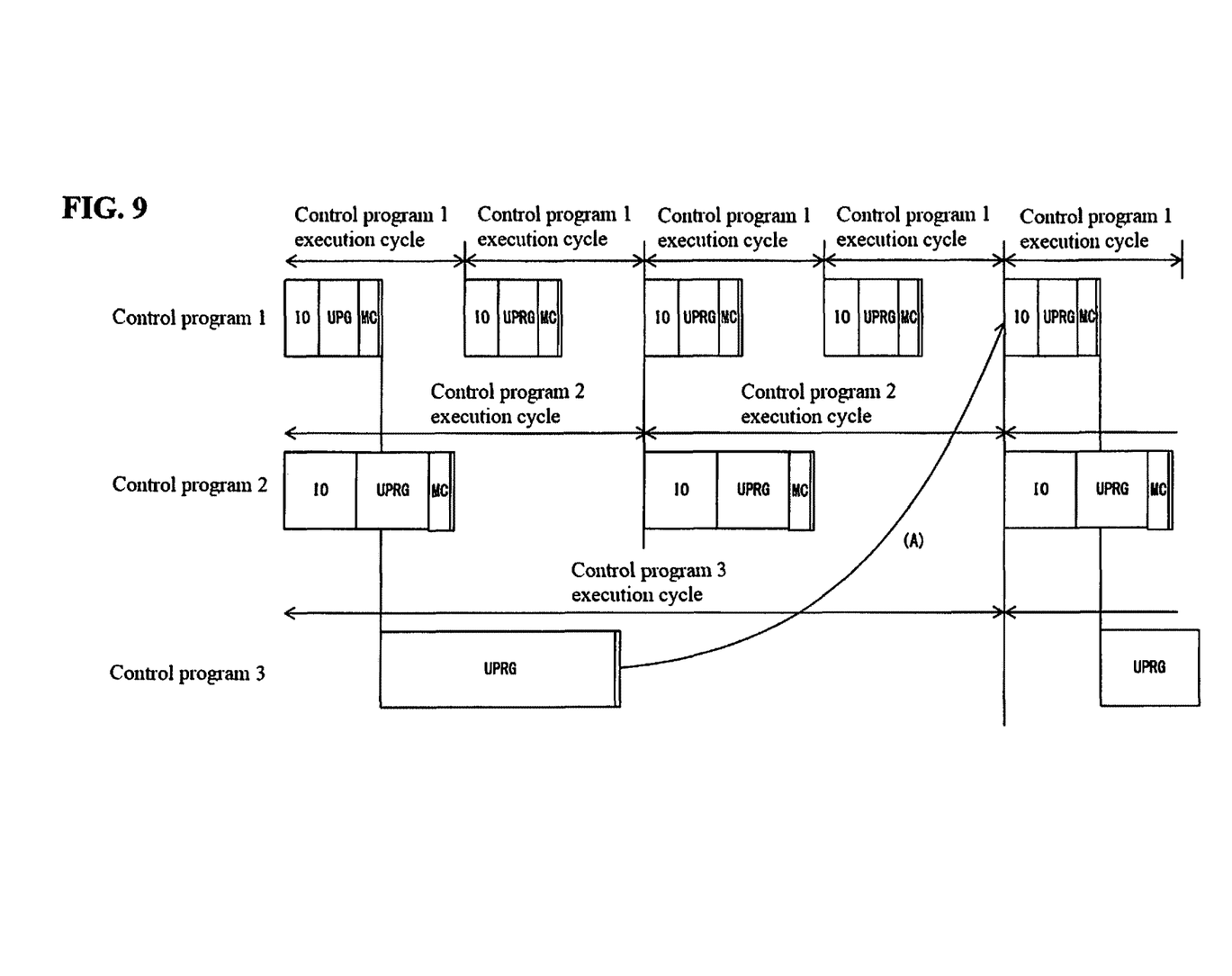
FIG. 9 is a diagram showing the execution timing of control programs 1 to 3.

FIG. 9 is a diagram showing the execution timing of the control programs 1 to 3. When the scheduling program detects the arrival of a predetermined time, it starts the execution of the control program 1 and the control program 2. It places the execution of the control program 3 in a standby state.

"IO" in the control program 1 shown in the figure indicates operations performed in accordance with commands in the IO control program. In accordance with commands in the IO control program 1, the core 1 of the microprocessor performs the transmission of output data and the importing of input data. (Further description of this processing has been omitted due to being similar to the previously-described processing.)

"UPG" in the control program 1 shown in the figure indicates operations performed in accordance with commands in the user program 1. In accordance with commands in the user program 1, the core 1 of the microprocessor performs sequence computation with use of the input data stored in the work area of the user program 1, performs processing for storing the output data in the communication buffer, and stores the output data in the area in which the motion computation program 1 performs computation.

"MC" in the control program 1 shown in the figure indicates operations performed in accordance with commands in the motion computation program 1. The core 1 of the microprocessor calculates command values for the motors with respect to the execution cycle of the control program 1, calculates output data, and stores the output data in the buffer for transfer to the communication controller. When the control program 1 is to end, although not shown, in accordance with commands in the system program, the input data and output data used in the control program 1 and the intermediate data used in the computation of the control program 3 are transferred to the work area for the control program 3.

"IO" in the control program 2 shown in the figure indicates operations performed in accordance with commands in the IO control program 2. In accordance with commands in the IO control program 2, the core 2 of the multicore processor performs the transmission of output data and the importing of input data. (Further description of this processing has been omitted due to being similar to the previously-described processing.)

"UPG" in the control program 2 shown in the figure indicates operations performed in accordance with commands in the user program 2. In accordance with commands in the user program 2, the core 2 of the microprocessor performs sequence computation with use of the input data stored in the work area of the user program 2, performs processing for storing the output data in the communication buffer, and stores the output data in the area in which the motion computation program 2 performs computation.

"MC" in the control program 2 shown in the figure indicates operations performed in accordance with commands in the motion computation program 2. The core 2 of the microprocessor calculates command values for the motors with respect to the execution cycle of the control program 2, calculates output data, and stores the output data in the buffer for transfer to the communication controller.

When the execution of the control program 1 is complete as described above, the scheduling program starts the execution of the control program 3 in the core 3 of the microprocessor.

"UPG" in the control program shown in the figure indicates operations that are included in the control program 3 and performed in accordance with commands in the user program 3. In accordance with commands in the user program 3, the computation in the user program 3 is executed with use of the data stored in the execution area of the control program 3, output data is calculated, and the output data of the control program 3 is stored in the output buffer of the control program 3.

Although not illustrated, in the scheduling program and the system program, output data is copied from the output buffer of the control program 3 to the buffer for transfer to the communication controller before the timing at which the execution cycles of the control program 1 and the control program 3 become aligned, and before the start of the control program 1.

According to this processing, the output data of the control program 3 is transferred to the communication controller in accordance with commands in the output processing program 1 in the fourth execution cycle of the control program 1 as shown by "A" in FIG. 9.

Although an example in which the control program 1, the control program 2, and the control program 3 are executed with use of three processor cores (cores 1, 2, and 3) is described in this example, the control programs can also be executed with use of two processor cores. In the case of executing these programs with two processor cores, the scheduling program starts the execution of the control program 3 in the idle time of the control program 1 or 2 after the execution of the control program 1 is complete. Even if the execution of the control program 3 is underway, when the execution start timing of the control program 1 or the control program 2 arrives, the scheduling program stops the execution of the control program 3 and resumes its execution in the idle time of the control program 1 or the control program 3.

When the execution start timing (timing at which an execution cycle is started) of a predetermined control program is reached, the execution of the control program 3 is placed in the standby state, the execution start timing of the control program 3 is set to a timing after the end of the execution of the control program 1, and data is copied from the work area for the control program 1 to the work area for the control program 3.

Accordingly, when considering which program is to be executed in the control program 1, the user can allocate a program that takes a relatively long amount of time to the control program 3. Accordingly, it possible to be able to further shorten the execution cycle of the control program 1.

The invention claimed is:

1. A control apparatus connected to a control target device via a network and that is configured to control the control target device by subjecting input data from the control target device to computation and outputting a result of the computation, the control apparatus comprising:

a microprocessor comprising a first core and a second core;

a communication circuit communicating with the connected control target device;

a first user program that is to be executed by the first core and a second user program that is to be executed by the second core, the first user program and the second user program defining content of control of the control target device;

a first motion computation program that is to be executed by the first core and that calculates a command value for the control target device in accordance with an instruction issued by the first user program according to a first cycle;

a second motion computation program that is to be executed by the second core and calculates a command value for the control target device in accordance with an instruction issued by the second user program according to a second cycle;

a first input program that is to be executed by the first core and a second input program that is to be executed by the second core, the first input program and the second input program being loaded to a memory via the communication circuit and placed in a state to process input data from the control target device;

a first output program that is to be executed by the first core and a second output program that is to be executed by the second core, the first output program and the second output program generating output data comprising the command values and transmitted via the communication circuit; and and a memory used for storage with a scheduling program, wherein the scheduling program;

causes the first input program, the first output program, the first user program, and the first motion computation program to be repeatedly executed by the first core according to the first cycle, causes the second input program, the second output program, the second user program, and the second motion computation program to be repeatedly executed by the second core according to the second cycle, and causes the first input program to be executed in parallel with at least a portion of the second input program such that;

a start of execution of a third program is caused in one of: the first core during a time remaining in the first cycle for which execution of one or more of: the first input program, the first output program, the first user program, and the first motion computation program repeatedly executed by the first core has been completed; and the second core during a time remaining in the second cycle for which execution of one or more of: the second input program, the second output program, the second user program, and the second motion computation program repeatedly executed by the second core has been completed;

a pause of execution of the third program is caused at a start of a next one of: the first cycle; and the second cycle when execution of the third program does not complete in the time remaining in the one of: the first cycle; and the second cycle; and completion of execution of the third program is caused in the next one of: the first cycle; and the second cycle or a succeeding one of: the first cycle; and the second cycle, in which time remaining in the next one of, or the succeeding one of: the first cycle; and the second cycle is available.

\* \* \* \* \*